United States Patent Office 3,186,822
Patented June 1, 1965

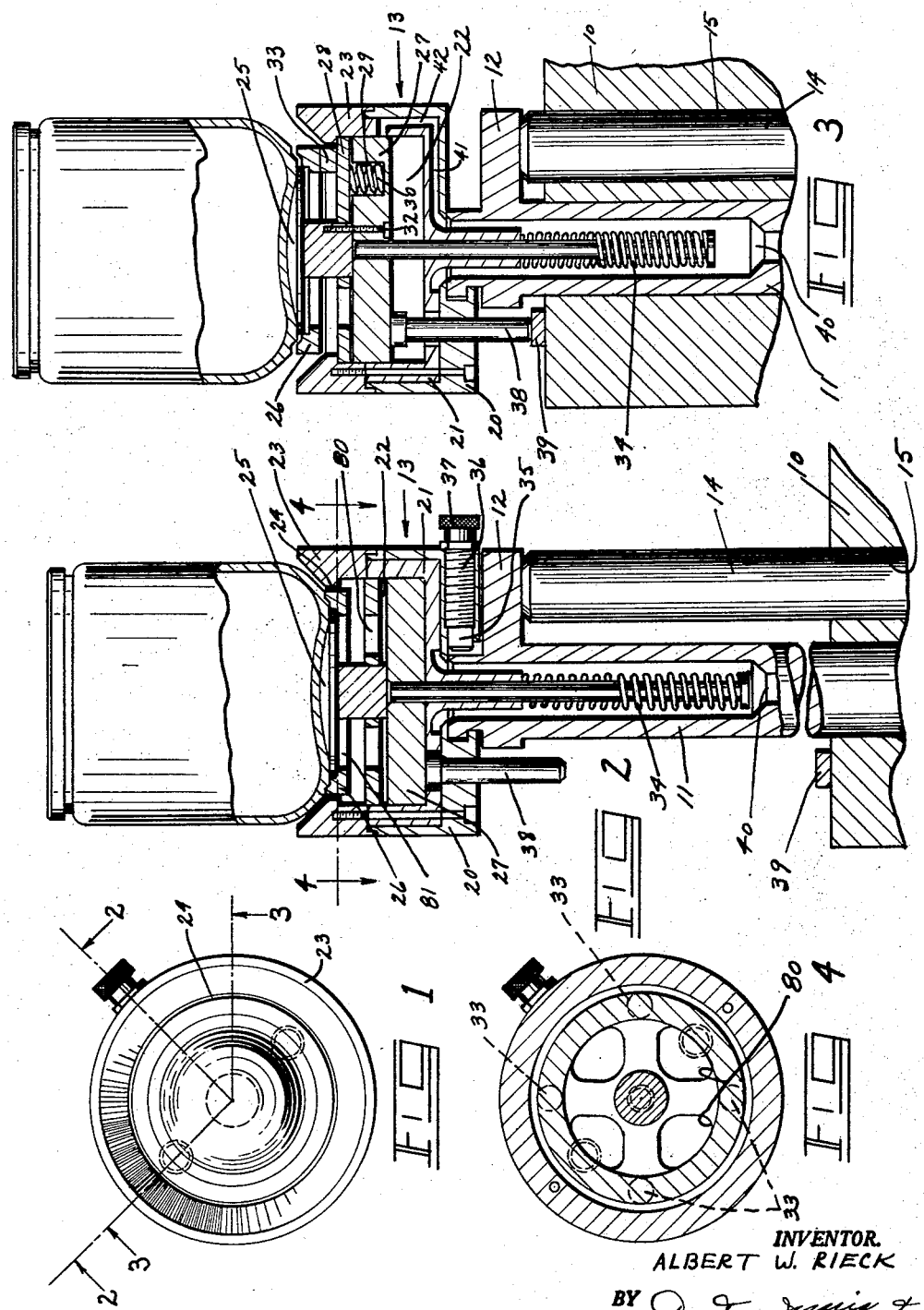

3,186,822
GLASSWARE COOLING AND TRANSFER APPARATUS
Albert W. Rieck, Waterville, Ohio, assignor to Owens-Illinois Glass Company, a corporation of Ohio
Filed July 7, 1961, Ser. No. 122,464
6 Claims. (Cl. 65—348)

This invention relates to apparatus for cooling and transferring glassware. U.S. Pat. No. 2,833,088 issued May 6, 1958 to R. H. Olson et al. is an example of this type apparatus and it is contemplated that the present invention constitutes an improvement thereover.

It has been found that in using a device as disclosed in U.S. Pat. No. 2,833,088, at relatively high speed, the ware support becomes excessively heated, causing some slight distortion of the bottom of the ware, when the ware is released to the support. Further, where the bottom of the ware is concave and the support complementally convex, there is a possibility that if the ware is not adequately cooled on the bottom, it may stick to the support with the result that a sweep-out arm will tip the ware rather than slide it smoothly from the support.

When the ware has what is termed a "stacker bottom" it is necessary that the transfer head be shaped to conform to the stacker bottom of the ware. This is particularly true since the ware is relatively soft and has not been chilled sufficiently to retain its shape if it were placed on a flat support. The stacker bottom has a relatively sharp ledge formed on the bottom of the ware which is adapted to seat within the closure cap when positioned upon a second container. When the ware support of the takeout mechanism has a stacker ring, it is extremely difficult to move the ware laterally by a sweepout arm without tipping the ware. With this in mind, applicant has provided a retractable stacker ring which will allow the ware to be laterally transferred with less chance that the ware will be tipped during transfer.

It is an object of this invention to provide a transfer device having improved supporting surface cooling.

It is a further object of this invention to provide a transfer apparatus for glassware wherein the stacker ring is retractable and the ware is positioned for easy lateral sliding movement relative to the transfer head.

Referring to the accompanying drawings:

FIG. 1 is a plan view of the apparatus of the invention;

FIG. 2 is a sectional view taken at line 2—2 on FIG. 1;

FIG. 3 is a view similar to FIG. 2 showing the parts in a different position and taken on the line 3—3 on FIG. 1 and FIG. 4 is a cross-sectional plan view taken at line 4—4 on FIG. 2.

Referring to FIGS. 1 to 4, the apparatus comprises a base 10 mounted on a stationary portion of a glass shaping machine. A vertically reciprocable shaft 11 extends out of the base 10, and has a crosshead 12 formed on the upper end thereof. A ware receiving head 13 is releasably mounted on the crosshead 12. A glass article positioned on the head 13 is moved vertically by the vertical movement of the shaft 11.

Vertical movement of the shaft 11 is achieved by a rod 14 contacting the under surface of the crosshead 12 and projecting downwardly into a cylindrical opening 15 in the base 10. The lower end of the rod 14 (not shown) may take the form of a piston whereby the application of fluid under pressure to the cylindrical opening 15 in the base 10 will force the rod 14 upwardly.

The head 13 comprises a cup-shaped housing or body 20 having a cup-shaped guide ring 21 seated therein and forming a cavity 22. The upper surface of the housing is closed by an annular air guide 23. The air guide 23 is formed with an opening 24 and an article support plate or shape maintaining member 25 is positioned in the opennig. The opening 24 and the support plate 25 are so dimensioned that an annular area is provided between the edge of the support plate 25 and the inner wall of the opening 24. Within the annular area, a stacker ring 26 is mounted for vertical movement relative to the support plate 25 and the air guide 23. The support plate 25, being generally T-shaped in cross-section, is connected at its lower end to a pedestal 27 positioned in the cavity 22. Mounted above the pedestal 27 is a retracting ring 28 which is vertically movable within the cavity 22 and carries the stacker ring 26 spaced above its upper surface. The pedestal 27 has four circumferentially spaced recesses 29 formed in the upper surface thereof with coil springs 30 mounted therein.

The shape-maintaining member or support plate 25 is fastened to the pedestal 27 by a screw 32 and the stacker ring 26 is connected to the retracting ring 28 by means of four spacer posts 33, which may be separate elements or formed integral with both the ring 26 and retracting ring 28.

The pedestal 27 and in turn the support plate 25 are normally urged downwardly under the action of the spring 34 and due to the fact that the support plate 25 fits in an annular recess in the upper surface of stacker ring 26, the stacker ring 26 will also be held down in retracted position as shown in FIG. 2. The head 13 is releasably mounted on the shaft 11 by a pin 35 maintained in engagement with the shaft 11 by means of threads 36. A knob 37 is mounted on the end of the pin 35 whereby the pin can be rotated and threaded outwardly away from the head 13 to release the body 20 from the shaft 11.

A pin 38 is mounted in an opening in the housing 20 and has its upper surface in contact with the lower surface of the pedestal 27. The lower end of the pin 38 projects downwardly out of the housing 20 whereby when the head 13 is moved downwardly, the projecting end of the pin 38 will contact the upper surface of a stop block 39 mounted on the upper surface of the base 10, causing the pedestal 27 to move upwardly relative to the air guide 23.

As shown in FIGS. 2 and 3, the surface of the air guide 23 surrounding the opening 24 is so dimensioned and contoured that a limited space is provided between the walls of the opening and the outer surface of an article positioned on the support plate 25. The walls of the opening in air guide 23 have approximately the same configuration as that of the bottom of the glass article to be positioned therein.

A cooling fluid such as air is supplied to the apparatus through a passageway 40 in the shaft 11 and thence outwardly through radiating passageways 41 in the under surface of guide ring 21 and then vertically upward through annular areas or passages 42 which open into cavity 22. Air within the cavity 22 passes out through an annular opening 24 in air guide 23 after passing through openings 80 in the retracting ring 28 and openings 81 in stacker ring 26 to impinge on the bottom surface of the article support plate or shape-maintaining member 25. As air under pressure is exhausted through the opening 24 in the air guide 23, it impinges on the sides and bottom of the glass article and by reason of the fact that the annular opening 24 and the clearance between the side of the jar and guide ring 23 is relatively small, a "venturi" effect is produced which tends to hold the article in close contact with the article support plate 25.

The operation of the above-disclosed apparatus may be summarized as follows:

Initially the head 13 is in its uppermost position and the article support plate 25 is lowered within the head 13. After an article of glassware is released from the forming apparatus, it is placed on the article support plate 25 in the head 13. A cooling fluid is passed between the stacker ring 26 and the walls of the opening 24 in the air guide 23 serving to form a layer or blanket of moving air surrounding the lower portion of the article and aid in cooling the article. Furthermore, due to the fact that the support plate 25 is exposed along a substantial portion of its under surface, it likewise will be cooled to a certain degree. Cooling the bottom of the ware is desirable from the standpoint that lateral transfer of the ware from the support plate 25 may be made without the possibility of the ware sticking to the plate 25.

After the ware has remained on the head a sufficient length of time to insure the "setting up" of the bottom of the ware, the head 13 is lowered in substantially the same manner as taught in U.S. Pat. No. 2,833,088 issued May 6, 1958 to R. H. Olson et al. As the head approaches its lowermost position, the pin 38 contacts the upper surface of the stop block 38 causing the pedestal 27 and support plate 25 to be elevated with respect to the air guide 23. The stacker ring thus engages the lower edge of the ware and supports the ware in a plane coincident with the top of the air guide 23. At the same time the retracting ring 28 will be moved vertically a lesser distance than the plate 25 due to its engagement with an annular rim formed in the air guide. Because of this limited movement of the ring 28, the stacker ring 26 will also not be raised the same amount as the plate 25 relative to the air guide 23.

In effect, the stacker ring 26 is retracted to the degree that its upper surface will lie in a common plane with the top of the air guide and the edge of the plate 25. This permits the ware to be easily slid laterally from the plate 25 to a position remote from the head 13. Furthermore, as shown in FIG. 3, movement of the head 13 relative to the base 10 occasioned by retraction of the head 13, will substantially cut off the introduction of air to the head 13 by reason of the fact that the outer periphery of the pedestal will overlie the passages 42 and prevent air from entering the cavity 22. In this manner cooling air is not wasted during the time when it would be relatively ineffective as a coolant.

By providing apparatus wherein a substantial portion of the ware support plate or shape-maintaining member is exposed to a cooling medium, it is apparent that the previously encountered problem of having the ware stick to the ware support plate has been alleviated.

Modifications may be resorted to within the spirit and scope of this invention as set forth in the appended claims.

I claim:

1. An improved ware support for a ware transfer device, said support comprising an air guide provided with a central opening, the inner walls of said opening having a configuration paralleling that of the lower portions of the ware, a stacker ring positioned centrally of said air guide and having an outer diameter slightly less than the diameter of said air guide opening, said stacker ring being formed with two distinct inner annular steps, one formed above the other with the upper step paralleling the shape of the stacker ledge formed on the bottom of the container to be handled, said stacker ring being mounted for vertical movement relative to said air guide, a shape-maintaining support member central of said stacker ring and having its peripheral edge seated within the lower annular step formed in said stacker ring with its upper rim surface merging with the bottom of said upper step, first resilient means normally retaining said shape-maintaining member seated within said recess in said stacker ring, second resilient means normally retaining both said shape-maintaining member and said ring in a horizontal plane beneath the upper surface of said air guide and means responsive to lowering of said ware support for raising said shape-maintaining member into a horizontal plane above the upper surface of said air guide and raising said stacker ring an amount less than said shape-maintaining member, whereby the ware is totally supported by said shape maintaining member.

2. Apparatus in accordance with claim 1 wherein said air guide has an internal shoulder below said shaped inner walls, a retracting ring vertically slidable within said air guide and having an annular shoulder, said stacker ring being mounted on said retracting ring whereby lowering of the air guide and ware support will result in said retracting ring engaging the shoulder in said air guide and limit the vertical position of the supper surface of said stacker ring to a plane parallel with the top of said air guide.

3. Apparatus for transferring and cooling glassware comprising a cup shaped, open-top body, an annular air guide fixed to the top of said body, said guide having an outwardly tapering inner surface at its top, a first plate loosely retained in said body for vertical movement relative thereto, means on said air guide for limiting the upward vertical movement of said first plate, a stacker ring within said body, means connecting said ring in spaced overlying relationship with respect to said first plate, a second plate in said body mounted below said first plate and said stacker ring, a ware bottom support member connected to said second plate and seated within said stacker ring, means between said second plate and said first plate for biasing said plates apart, means for lowering said body and means responsive to lowering of said body for raising said first and second plates, the ring and the ware bottom support member.

4. An apparatus in accordance with claim 3 wherein said means on said air guide for limiting the upward, vertical movement of said first plate comprises, an internal shoulder formed in said air guide below said tapered inner surface, and said first plate has an external shoulder engageable with said internal shoulder upon lowering of said body to limit the vertical movement of said stacker ring to less than the vertical movement of said bottom support member.

5. An improved ware support for a ware transfer device comprising a cup shaped open-top body, an annular air guide mounted on said body and having a central opening therethrough with a configuration paralleling the bottom portions of the ware, a stacker ring positioned centrally of said air guide, said air guide and ring forming an annular opening therebetween, a shape-maintaining member central of said stacker ring, means within said body for supporting said ring for vertical movement relative to said air guide, means on said air guide for limiting the upward, vertical movement of said ring supporting means, means within said body for supporting said shape-maintaining member, first resilient means between said ring supporting means and said member supporting means for biasing said supporting means apart, second resilient means for biasing both said supporting means in a downward direction, means for lowering said body and means responsive to lowering of said body a predetermined extent for compressing said first resilient means to raise said shape-maintaining member into a plane above said stacker ring and above the level of the air guide.

6. The apparatus as defined in claim 3 further including means for conveying air to the bottom of said body, said body having passages in the bottom thereof extending up the sidewall and opening into the interior thereof for conveying cooling air to the interior of said body above the top of said second plate when said plate is in retracted position and cooperating wall means on said second plate for blocking the flow of air from said passages into said body upon the lowering of said body.

References Cited by the Examiner
UNITED STATES PATENTS

| | | | |
|---|---|---|---|
| 851,904 | 4/07 | Steimer | 65—357 |
| 1,854,471 | 4/32 | Hofmann | 65—348 |
| 2,833,088 | 5/58 | Olson et al. | 65—348 |

DONALL H. SYLVESTER, *Primary Examiner.*